United States Patent
Post et al.

(10) Patent No.: US 8,459,580 B2
(45) Date of Patent: Jun. 11, 2013

(54) GRINDER-DISPENSER APPARATUS FOR FROZEN MATERIAL

(75) Inventors: Jan Post, Sassenheim (NL); Goran Aleksijovski, Noordwijk (NL); Wouter Dijkstra, Soest (NL); Cristian Bormetti, Como (IT); Marco Bianchi, Lido di Carnaiore (IT); Bob Honsbeek, Oegstgeest (NL)

(73) Assignees: Starstatus Trading Internacional LDA, Funchal, Madeira (PT); Fast & Fluid Management, B.V., Sassenheim (NL)

( * ) Notice: Subject to any disclaimer, the term of this patent is extended or adjusted under 35 U.S.C. 154(b) by 0 days.

(21) Appl. No.: 13/437,601

(22) Filed: Apr. 2, 2012

(65) Prior Publication Data

US 2012/0205474 A1 Aug. 16, 2012

Related U.S. Application Data

(63) Continuation of application No. PCT/EP2009/007081, filed on Oct. 2, 2009.

(51) Int. Cl.
*B02C 19/00* (2006.01)

(52) U.S. Cl.
USPC ............ 241/35; 241/282; 241/DIG. 17

(58) Field of Classification Search
USPC .................. 241/35, 36, 282, DIG. 17
See application file for complete search history.

(56) References Cited

U.S. PATENT DOCUMENTS

| 2,075,522 | A | * | 3/1937 | Hughes | 241/92 |
| 2,479,080 | A | | 8/1949 | Orrell | |
| 3,688,997 | A | * | 9/1972 | Ullner | 241/36 |
| 4,394,984 | A | * | 7/1983 | Hight et al. | 241/278.1 |

FOREIGN PATENT DOCUMENTS

| EP | 1230982 A1 | 8/2002 |
| RU | 2346746 C1 | 2/2009 |
| WO | WO03099027 A1 | 12/2003 |
| WO | WO2006061187 A3 | 9/2006 |
| WO | 2007137870 A1 | 12/2007 |
| WO | 2008029100 A1 | 3/2008 |
| WO | 2009003033 A1 | 12/2008 |

OTHER PUBLICATIONS

PCT International Search Report, International Application No. PCT/EP2009/007081, dated Dec. 8, 2010, 4 pages.
PCT International Preliminary Report on Patentability, International Application No. PCT/EP2009/007081, dated Dec. 21, 2011, 6 pages.

* cited by examiner

*Primary Examiner* — Faye Francis
(74) *Attorney, Agent, or Firm* — Fish & Richardson P.C.

(57) ABSTRACT

A grinding apparatus for dispensing a dose of ground frozen material starting from a frozen block includes a grinding unit for grinding the frozen block in order to provide an amount of ground frozen material and a feeding unit for feeding the frozen block to the grinding unit. In particular, the feeding unit includes a feeding member that is adapted for moving frozen block for a desired predetermined grinding stroke against grinding unit such that a grinding length of block is ground. A grinding unit provides at least one grater and one motor for causing the grater to rotate. In order to obtain a desired weight of the dose, a volume of frozen material is calculated that corresponds to said weight, since the density of the frozen material is known.

17 Claims, 9 Drawing Sheets

GRINDER-DISPENSER APPARATUS FOR FROZEN MATERIAL

CROSS-REFERENCE TO RELATED APPLICATION

This application is a continuation of PCT/EP2009/007081, filed Oct. 2, 2009, which is incorporated herein by reference

FIELD OF THE INVENTION

The present invention relates to an apparatus for dispensing frozen material that is adapted to dispense a determinate dose of ground frozen material starting from a frozen block. In particular, the present invention relates to an apparatus for dispensing ground frozen food.

DESCRIPTION OF THE PRIOR ART

Various types of food dispensing devices are known in the art for grinding frozen blocks, as described for example in WO2009003033, RU2346746, WO03099027.

Such machines are not suitable for grinding frozen material in order to provide small doses of frozen ground material, so that each dose has a predetermined quantity of ground material.

In particular, it is desirable that the block is ground for a determined amount in order to provide a determined dose of frozen ground material. It is also desirable that the machine stops grinding the frozen block and starts again grinding when a further dose is required.

It is also, in particular, desirable that each dose of ground material has a determined size of the ground frozen granules. Normally, it is required that a grating or grinding part is changed and replaced by another one that is adapted to grind the frozen material with the desired different granulometry. This solution, however, requires to open the machine, to unlock the grating part, to lock it again and to close the machine, and for this reason it is disadvantageous.

It is also, in particular, desirable to prepare mixtures of different frozen material. This can be carried out by grinding in parallel the blocks, and then to mix eventually the ground frozen material in order to form the desired mixture.

These problems may arise for example in a machine like that disclosed in WO2006061187 or in WO2007137870, where an apparatus is described that is capable of dispensing a dose of warm food product creating a ready-to-eat single-dose warm food product. In particular, solid food components are provided at the inlet of the apparatus, then they are shredded and moved to a mixing and heating chamber.

In such machines, some components are kept at a low preserving temperature up to the introduction in the heating chamber. In this case the components with the respective shredders can be kept at a preservation temperature by a refrigerating chamber that contains them. To this purpose, the apparatus comprises an automatic refrigerated feeder of a food component. It can be for example a shredder of a frozen block of cheese. In order to prepare desired recipes, other blocks can be provided and ground selectively and separately, for example tomato, ham, salami, various different vegetables, etc., and then mixed in such a way to obtain the desired recipe.

Accordingly, the need is felt dosing precisely the food components, and then stopping the grinding step in order to start again only when a further dose is required.

Moreover, another problem arises concerning adjusting the size of the granules of the ground frozen food, without changing the grating element. A further problem arises of grinding selectively the frozen blocks and providing desired mixtures of ground frozen food.

SUMMARY OF THE INVENTION

It is a feature of the present invention to provide a grinder-dispenser apparatus that is adapted to dispense a desired dose of a frozen ground material in a minimum waiting time.

It is also a feature of the present invention to provide a grinder-dispenser apparatus that is adapted to dispense a dose of a frozen ground material and to stop until another dose is required.

It is also a feature of the present invention to provide a grinder-dispenser apparatus that is more accurate with respect to the prior art systems.

It is yet a feature of the present invention to provide a grinder-dispenser apparatus that is adapted to grind the frozen material with a desired granulometry without changing the grater.

It is another feature of the present invention to provide a grinder-dispenser apparatus has a simple structure and is easy to manufacture.

It is a particular feature of the present invention to provide such a grinder-dispenser apparatus that is adapted to provide doses of ground frozen food.

These and other features are achieved by an apparatus for dispensing a dose of ground frozen material starting from a frozen block, said apparatus comprising:
- a grinding means, for grinding said frozen block in order to provide an amount of ground frozen material;
- a feeding means for feeding said frozen block to said grinding means; wherein said feeding means comprises:
- means for moving said frozen block for a desired predetermined grinding stroke against said grinding means, and causing the block to be ground for a length that corresponds to said grinding stroke, and then to stop said frozen block,
- means for adjusting said grinding stroke such that said amount of ground frozen material corresponds to a desired dose of ground frozen material.

Advantageously, said means for adjusting said grinding stroke comprises a means for adjusting the speed of said grinding stroke.

Advantageously, said means for moving comprises a push member that is adapted to push said frozen block against said grinding means.

In particular, said grinding means provides at least one grater and one motor for causing said grater to rotate, a means for adjusting the speed of said motor being provided such that the granulometry of said ground frozen material can be adjusted up to achieving a desired granulometry value.

Advantageously, said means for adjusting the speed of said grinding stroke is adapted to adjust the speed of said grinding stroke responsive to the speed of said motor.

Alternatively, said means for adjusting the speed of said motor is adapted to adjust the speed of said motor responsive to the speed of said grinding stroke.

Preferably, a refrigerating chamber is provided in which said grinding means and said feeding means are housed and kept under a freezing temperature.

Advantageously, a further means for moving a further frozen block against said grinding means is provided, such that two frozen blocks can be selectively or contemporaneously moved against said grinding means.

Preferably, said grinding means comprises a drum-shaped grater.

In particular, said grinding means comprises one drum-shaped grater and a further means for moving a further frozen block against said drum-shaped grater is provided, wherein said means for moving and said further means for moving are arranged at an angle with respect to each other such that two frozen blocks can be moved against said drum-shaped grater, approaching said drum-shaped grater from two different directions.

Advantageously, said grinding means comprises two counter-rotating drum-shaped graters.

Alternatively, said grinding means comprises a single drum grater having different grating portions, in particular that is adapted to grind a block having more layers, each layer corresponding to a respective grating portion. This solution is useful when different ground frozen materials have to be prepared, by preliminarily preparing a multilayer block. Owing to different density, resistance and desired size of the ground frozen material, the grater portions may have different cutting profiles.

Alternatively said grinding means comprises a reciprocating grating plate. Advantageously, said grating plate has different grating portions, in particular adapted to grind a block having more layers, each layer corresponding to a respective grating portion.

Advantageously, a plurality of independent means for moving is provided, each for moving one frozen block against said grinding means, wherein a program means is provided for operating selectively said means for moving in order to obtain a mixture of ground frozen materials according to a determined dose and a determined recipe. Advantageously, said means for moving is adapted to be charged with at least two frozen blocks in series, such that a first frozen block is moved against said grinding means and a second frozen block closely follows said first frozen block and is eventually moved against said grinding means when said first frozen block has been completely ground. In particular, said means for moving comprises a push member that is adapted to push said second frozen block against said first frozen block such that said first frozen block is pushed against said grinding means and such that when said first frozen block has been completely ground a third frozen block can be charged between said push member and said second frozen block.

Advantageously, said program means is adapted to operate said means for adjusting the speed of said grinding stroke in order to adjust the speed of said push member when said first frozen block has been almost completely ground up to when said grinding means starts grinding said second frozen block, in such a way that a desired dose of frozen material is ground when passing from the first block to the second block.

According to another aspect to the invention, an apparatus for dispensing a warm food product comprises a means for receiving at least one component of said food product as a dose of ground frozen food material, heating said dose and putting it, once heated, into a stiff edible container, creating a ready to eat combination of said dose and of said edible container, wherein said means for receiving is adapted to receive said dose of ground frozen food material from the apparatus as above defined.

BRIEF DESCRIPTION OF THE DRAWINGS

Further characteristic and the advantages of the apparatus, according to the invention, will be made clearer with the following description of an exemplary embodiment thereof, exemplifying but not limitative, with reference to the attached drawings, in which like reference characters designate the same or similar parts, throughout the figures of which.

DESCRIPTION OF A PREFERRED EXEMPLARY EMBODIMENT

Figure 1:
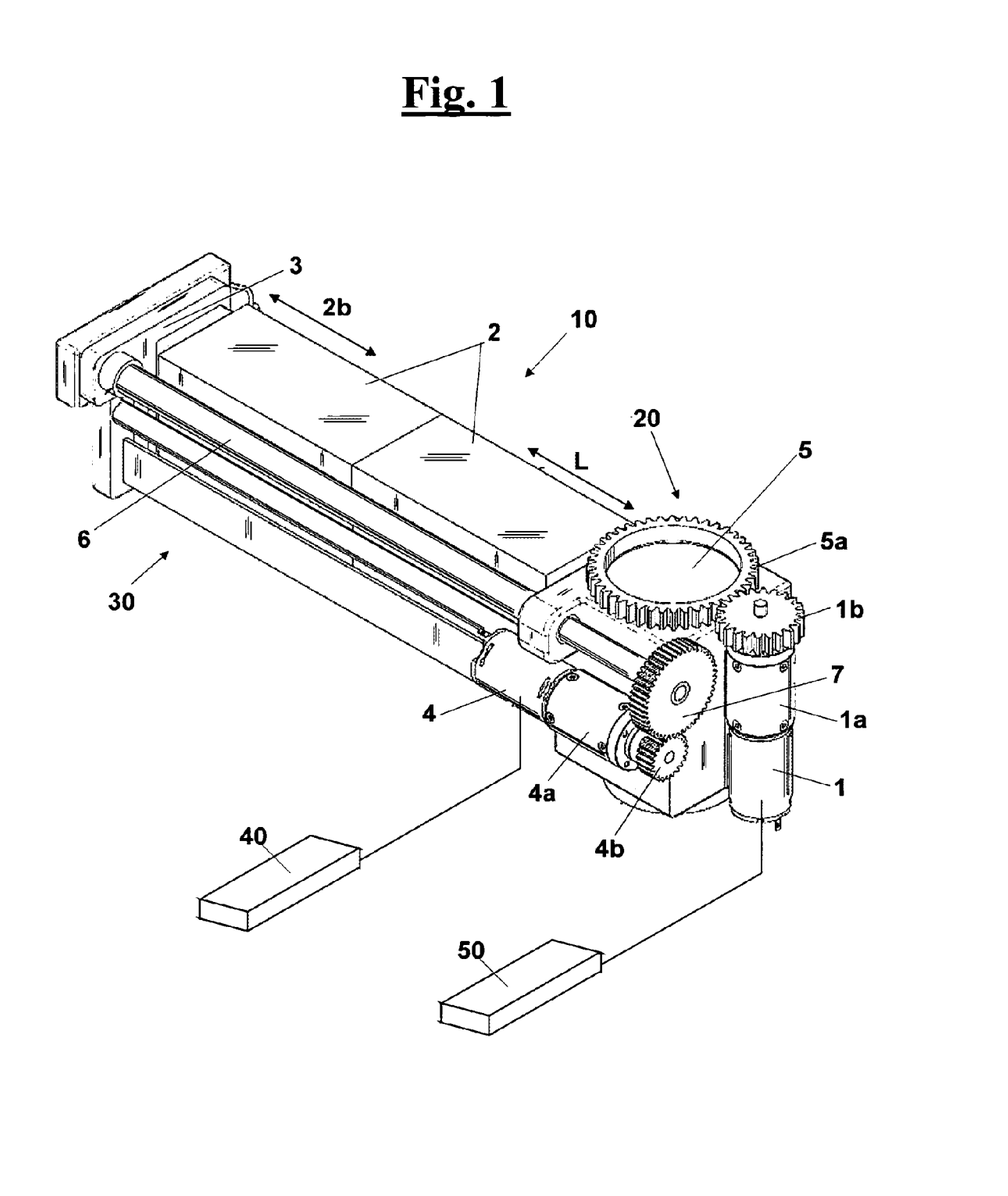
FIG. 1 shows a grinding apparatus according to the invention, with a feeding unit and a grating unit that are adapted to grind a frozen block.

As shown in FIG. 1 a grinding apparatus 10 is depicted for dispensing a dose 2a (FIG. 3) of ground frozen material starting from a frozen block 2.

The apparatus 10 comprises:
- a grinding unit 20, for grinding the frozen block 2 in order to provide an amount of ground frozen material;
- a feeding unit 30 for feeding the frozen block to the grinding unit.

More in detail, the feeding unit 30 comprises a feeding member 3 that is adapted for moving frozen block 2 for a desired predetermined grinding stroke 2b against grinding unit 20 such that a grinding length L of block 2 is ground. In particular, feeding member 3 is a push member that is operated by a motor 4, via a reduction gear 4a, a gear transmission 4b, 7, and a screw actuator 6.

With reference again to FIG. 1, grinding unit 20 provides at least one grater 5 and one motor 1 for causing the grater 5 to rotate. A reduction gear 1a is provided and transmission gears 1b and 5a for transmitting the torque of the motor 1 to grater 5. The push member 3, as above described, causes the block 2 to move against grinding unit 20, in order to be ground for length L, also shown in FIG. 3, that corresponds to grinding stroke 2b of push member 3. A adjustment unit 40 for adjusting the grinding length L and grinding stroke 2b can be provided and a unit 50 for adjusting the speed of the motor 1 can be also provided, as described below.

Figure 2:
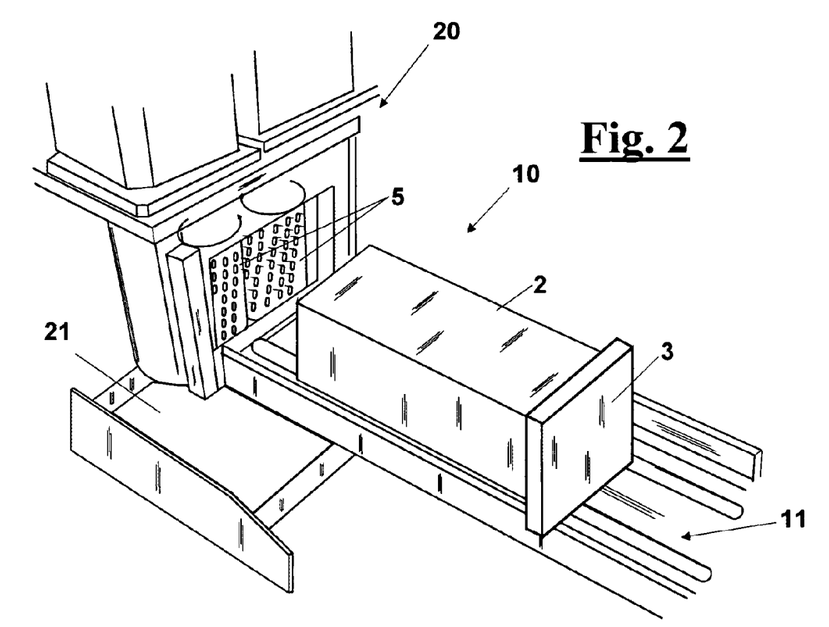
FIG. 2 shows a frozen block that is prepared on a feeding unit before being fed to the grating unit.
Figure 3:
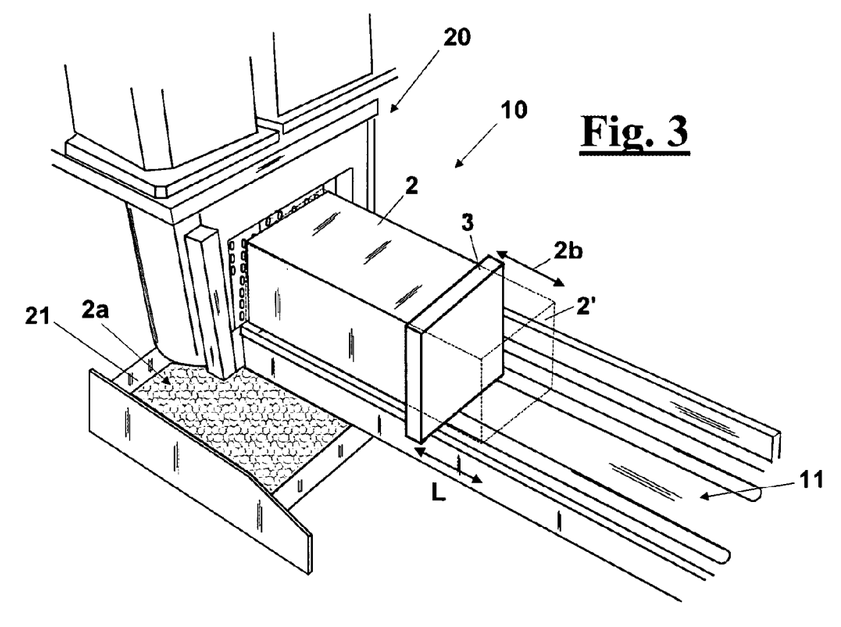
FIG. 3 shows the frozen block after grinding a frozen material dose which has a volume corresponding to a prefixed grinding stroke.

As shown in FIGS. 2 and 3 a frozen block 2 is arranged on a feeding unit 11 such that it can be fed to the grating unit by push member 3. In FIG. 3 the frozen block is shown after having ground away a frozen material dose having a volume corresponding to grinding stroke 2b and length L.

In FIGS. 2 and 3 grinding unit 20 comprises two counter-rotating drum-shaped graters 5, with a vertical axis such that the dose 2a falls down on a supporting shelf 21.

At the end of grinding stroke 2b push member 3 stops so that also frozen block 2 stops, and no further ground frozen material is added to the already ground dose 2a.

Figure 4:
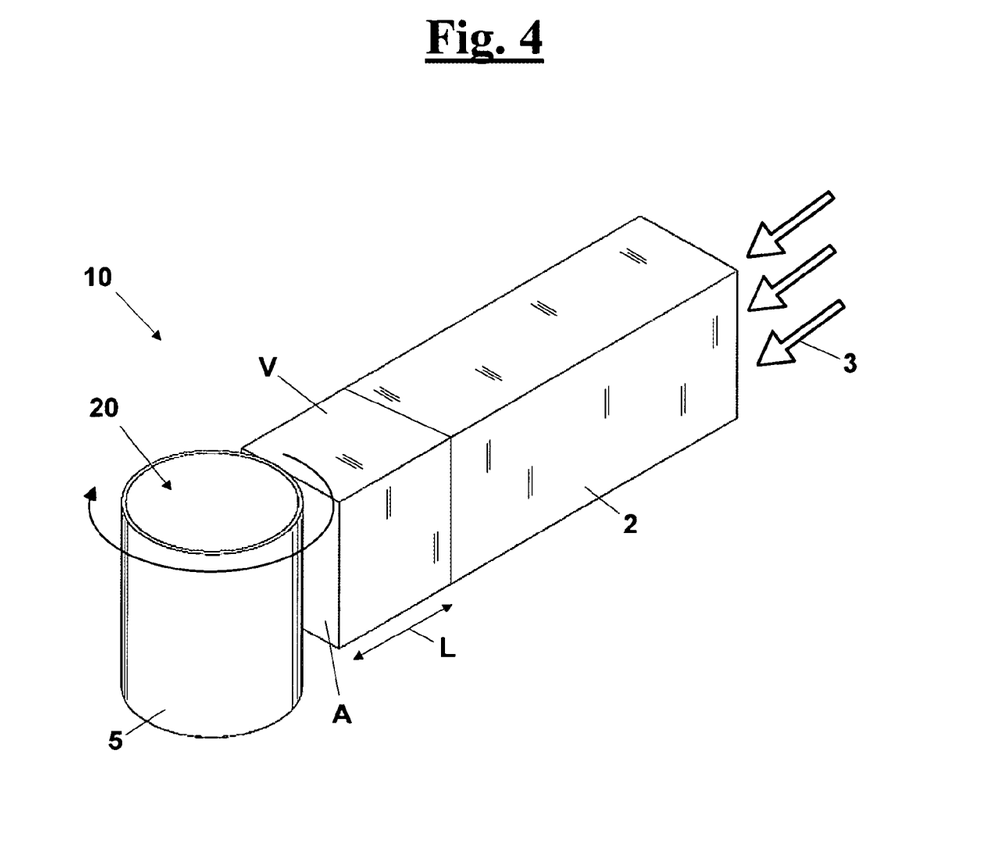
FIG. 4 shows an alternative embodiment of the grater, and shows also schematically how a dose is obtained from a frozen block, by grinding a volume V corresponding to a grinding length L of the block.

More precisely, as shown schematically in FIG. 4, in order to obtain a desired weight W of the dose, a volume V of frozen material is calculated that corresponds to said weight W, since the density D of the frozen material 2 is known. For this reason, the block 2 is preliminarily prepared having a desired known shape, for example a parallelepiped, or a cylinder, or a shape similar to a parallelepiped, or a cylinder, having a known cross section A. In this case the block has a parallelepiped shape.

In this way, grinding length L is calculated so that the volume V of the ground dose is L·A. The weight W is obtained by the volume V multiplied by the density D of the block 2.

If a determined dose 2a has to be dispensed, in terms of weight of ground frozen material, the corresponding grinding stroke is L=W/(D·A). So, an adjustment unit changes accordingly the grinding length L in order to adjust the weight of the ground frozen material.

In particular, adjustment unit 40 (FIG. 1) adjusts the grinding length L such that the amount of ground frozen material corresponds to a desired dose 2a of ground frozen material.

Figures 4A, 4B, 4C:
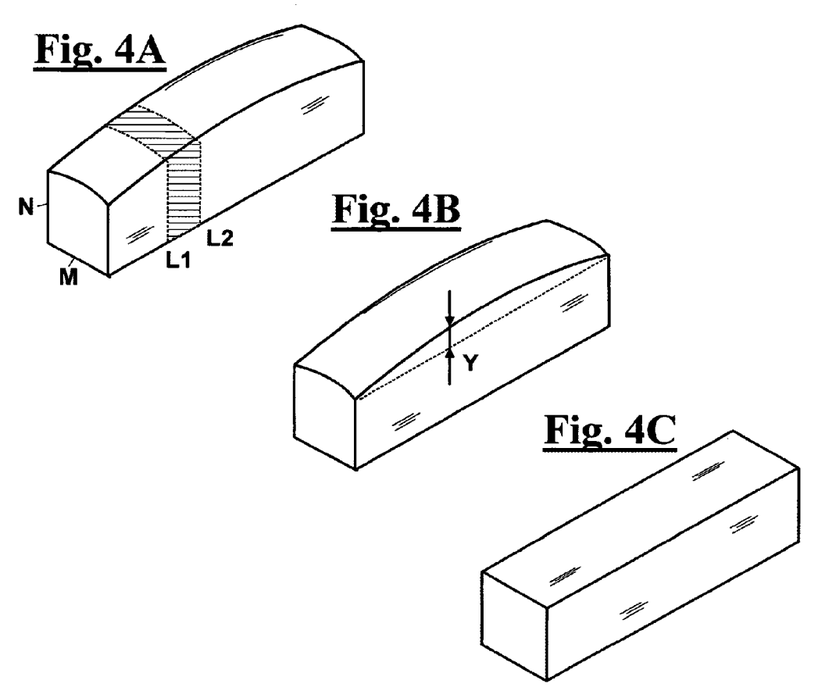
FIGS. 4A, 4B and 4C show schematically a computing control system that calculates the correction of the length of the linear displacement based on the volumetric shape of an ingredient block.

In case the blocks are not perfect parallelepiped or cylinders, as shown in FIGS. 4A, 4B and 4C a program means for correcting the cross section of the block is provided, both at the beginning and end of the block, and also throughout the block. For example the block may be obtained in a mould, and the may have a trapezoidal cross section and slightly tapered ends.

In particular, the adjustment unit 40 can include a computing control system that calculates the correction of the length of the linear displacement based on the volumetric shape of the ingredient block 2.

For example, as shown in FIG. 4B a calculation can based on a mathematical formula like y=−0, 001L*L+0, 001*130*L for a 1 dimensional elliptical deviation of the top part of the ingredient block.

A more general formulation to describe the block shape can be defined as $$\iint_{L1}^{L2} M \cdot N \cdot dM \cdot dN$$

where M and N are the sides of the block cross section, and L1 and L2 define the grinding length L of the block.

Figure 4D:
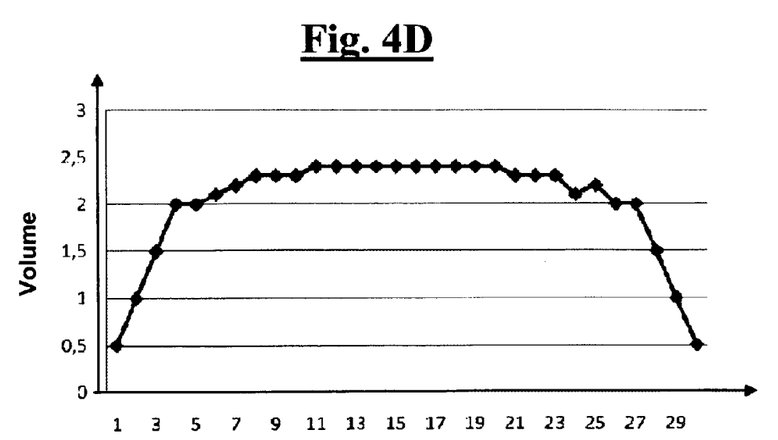
FIG. 4D shows a calibration diagram that represents a volume per distance ingredient displacement.

Adjustment unit 40 of FIG. 1 can include program means that follows a calibration diagram that represents the volume per distance ingredient displacement, as shown in FIG. 4D. In particular, at each cm of stroke the volume of the cm$^3$ of ground material is indicated in ordinates. Since the blocks have not perfectly square-cut ends, the diagram shows that the volume of material that is ground for each cm of stroke is lower at the ends and maximum at the central region of the block.

For this reason, it is possible to calculate the dose in correspondence at the beginning or end of a block. In particular, in case of passage between two blocks the program means automatically corrects the calculation of the dose, and adjusts the stroke accordingly. Alternatively, the program means can subtract any empty spaces that exist between two blocks, and then adjust the stroke accordingly.

Figure 5:
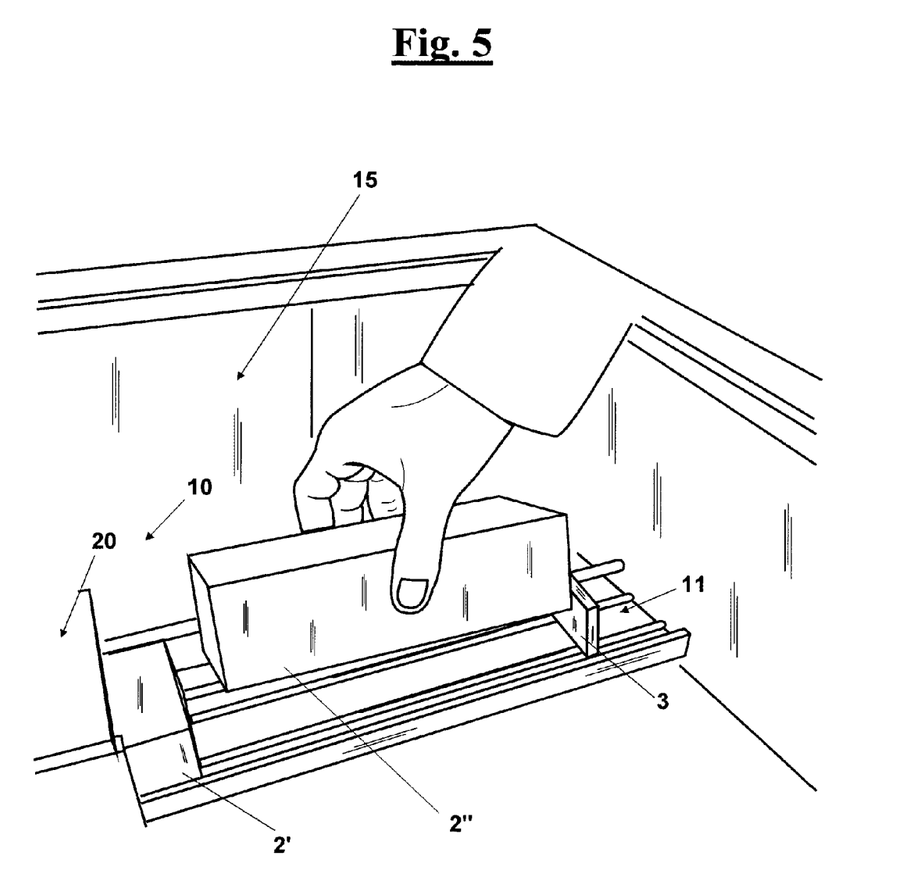
FIG. 5 shows a partial perspective view of a refrigerating chamber which houses a grinding apparatus.

This calculation is useful in particular in the case shown in FIG. 5, when a first block 2' has been almost completely ground by grater 5 and a second block 2" is added. Block 2 can be easily added after that push member 3 has returned back to a starting position along a support guide 11. A signal means can be provided to signal for how much length block 2' has been ground. This signal means can calculate, for example the number of grinding strokes L that are left before that block 2' is ended and then communicate to a user such number of left grinding strokes/doses such that well in advance before that block 2' is completely finished, second block 2" can be added. Then pusher 3 pushes block 2" against block 2', until the latter is completely ground.

Figure 6:
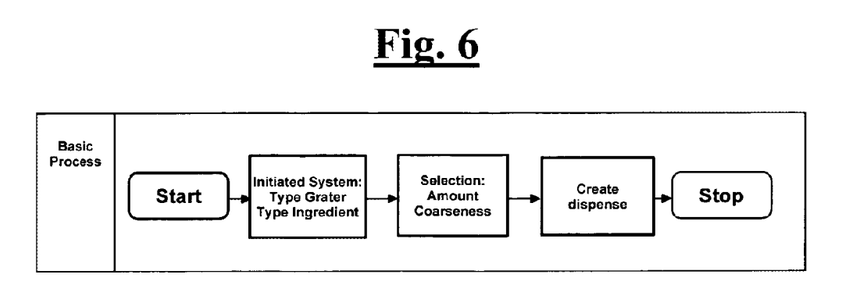
FIGS. 6 and 6A show respectively a simple and a more detailed flow charts of the adjustment and control process for obtaining the dose of the frozen material.
Figure 6A:
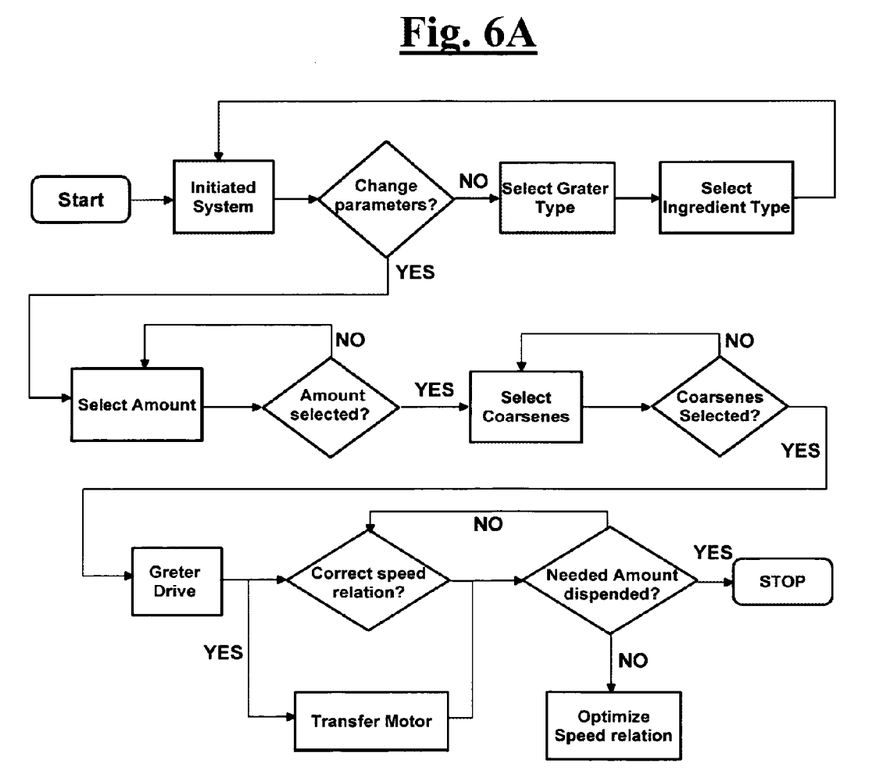
Figure 7:
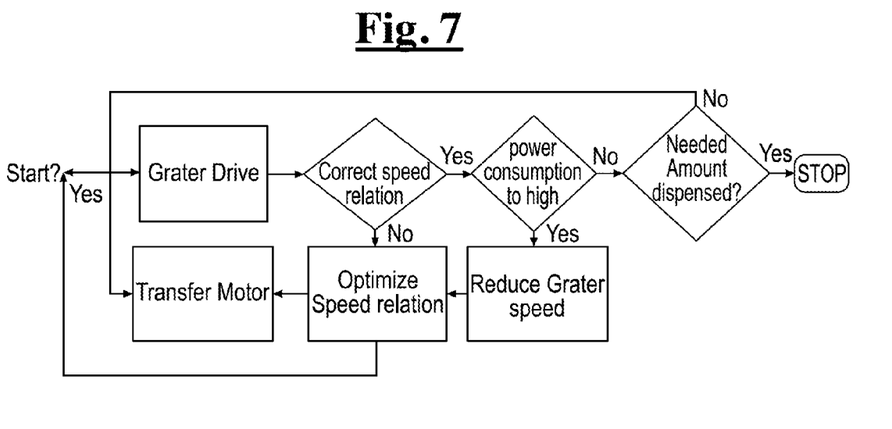
FIG. 7 shows respectively a flow chart of force control of the block against the grater.

In a preferred embodiment, adjustment unit 40 for adjusting the grinding length L comprises also a unit for adjusting the speed of the grinding stroke L, as described below with reference to FIGS. 6, 6A and 7. Grinding stroke adjustment unit 40 and grater speed adjustment unit 50 can operate separately or responsive to each other. Grinding stroke adjustment unit 40 and grater speed adjustment unit 50, in particular, can be controlled responsive to each other so that the granulometry of the ground frozen material is adjusted up to achieving a desired granulometry value. In particular, granulometry is a function of the force with which the block is pushed against the grater, but also of the reciprocating or rotating speed of the grater. For example, a grater that rotates slowly with high force of pusher 3, corresponds to a maximum size of the frozen granules. Instead, a grater that rotates fast with low force of pusher 3, corresponds to a minimum size of the frozen granules, like a snow of ground frozen material.

Concerning the force of the block against the grater, this is responsive to the programmed advancement speed of the block against the grater, i.e. the speed of pusher 3. The more the speed, the more the force. In fact, the speed of the block is the speed with which the block is ground by the grater. It may be not necessary to control the force directly of push element 3, except from the case of passing a maximum pushing force. The maximum pushing force can be controlled for example directly by motor 1 or by transmission gear 1a or by a clutch means in the grater transmission chain.

Figure 8:
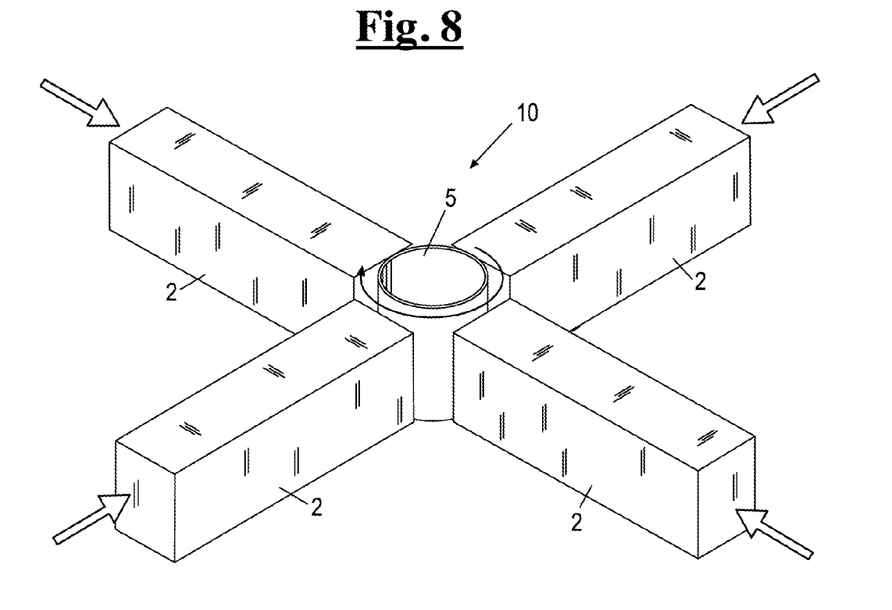
FIG. 8 shows an alternative embodiment of the grater with four blocks that are fed along respective different directions.

FIG. 5 shows also a refrigerating chamber 15 that is provided for housing the whole grinding apparatus 10. The room within refrigerating chamber 15 can be also exceed the space necessary to house grinding apparatus 10 for storing additional blocks, as a reserve. Moreover, in refrigerating chamber 15 several grinding apparatus 10, for a corresponding number of blocks 2 can be housed, as in the case shown in FIG. 11 where six blocks 2 and grinding apparatus 10 are provided. As shown in FIG. 8, a further unit for moving a further frozen block against the grater unit 20 is provided, such that four frozen blocks 2 are selectively or contemporaneously moved against a same grinding unit 10. In this case the grinding unit comprises a single drum-shaped grater 5. In general, the grinding unit comprises one drum-shaped grater and several units for moving a further frozen block against the drum-shaped grater 5, and the units for moving are arranged at an angle (in FIG. 8 the angle is 90°.) with respect to each other such that two frozen blocks 2 can be moved against the drum-shaped grater approaching it from different directions.

This is advantageous and allows a program unit to operate selectively the moving units to cause the blocks to be ground and then to obtain a mixture of different ground frozen materials according to a determined dose and a determined recipe. In the case of FIG. 8 four blocks are ground selectively or contemporaneously.

In case of food frozen material, for example mozzarella cheese, tomato, ham and a vegetable, many different recipes can be prepared by selectively moving the blocks 2 against the drum shaped grater 5.

Figure 9:
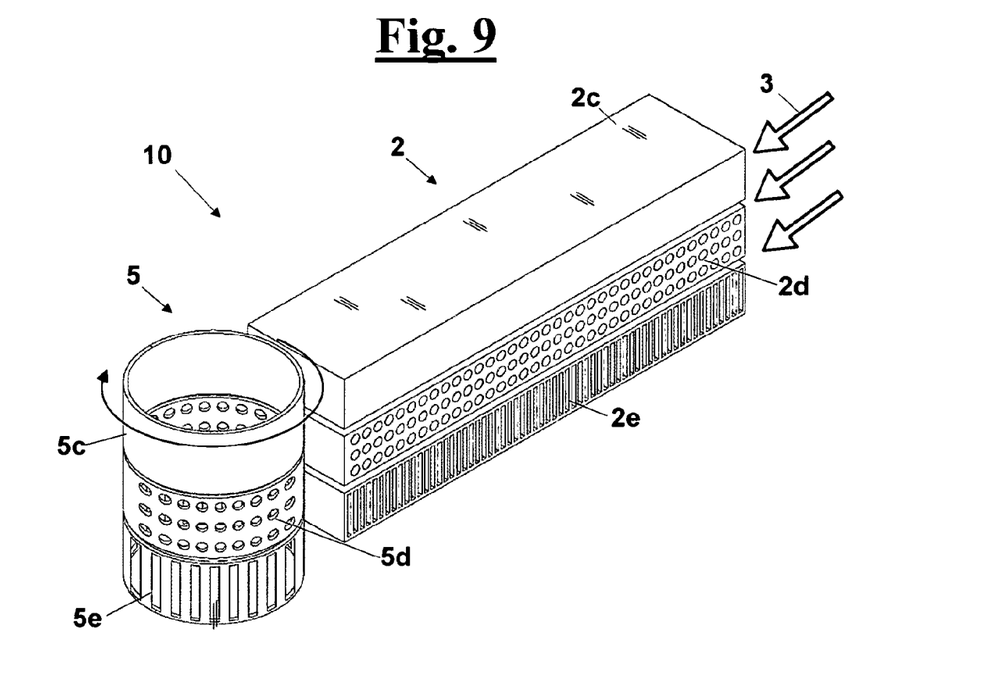
FIG. 9 shows an alternative embodiment of the grater and of the block with a single drum grater having different grating portions and a block having more layers, each layer corresponding to a respective grating portion.

In the example of FIG. 9 an alternative embodiment is shown of the grater and of the block with a single drum grater having different grating portions and a block having more layers, each layer corresponding to a respective grating portion. This solution is useful when different ground frozen materials have to be prepared, by preliminarily preparing a multilayer block. Owing to different density, resistance and desired size of the ground frozen material, the grater portions may have different cutting profiles.

Figure 10:
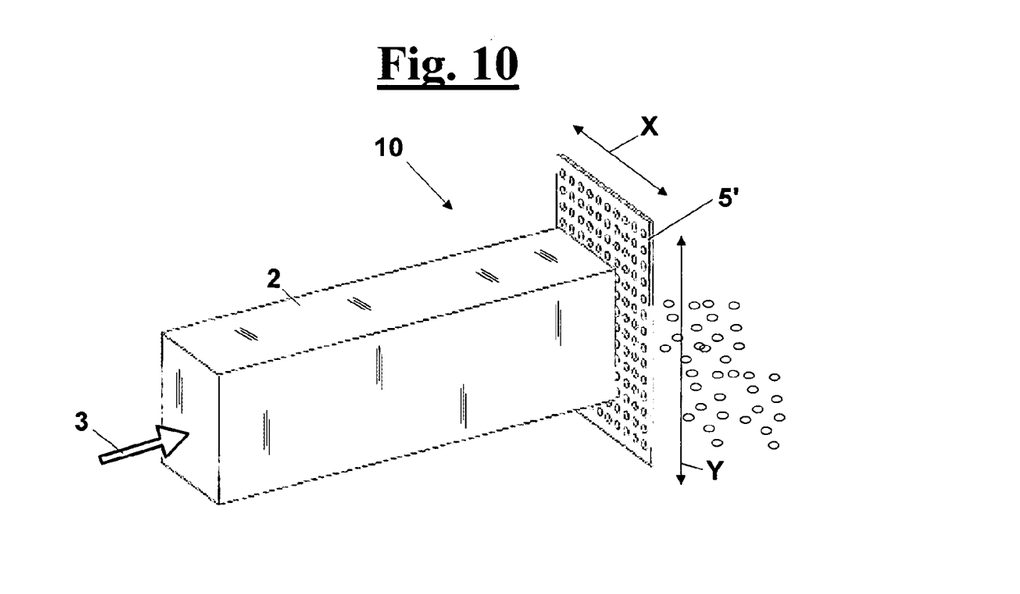
FIG. 10 shows an alternative embodiment of the grater that has a reciprocating grating plate.

Even if drum-shaped graters have been cited as an example, other type of graters can be used, for example a reciprocating grating plate 5', shown in FIG. 10, that is adapted to move, for example according to two direction X and Y. In particular, grating plate 5' may have different grating portions, in particular adapted to grind a block having more layers, each layer corresponding to a respective grating portion.

Figure 11:
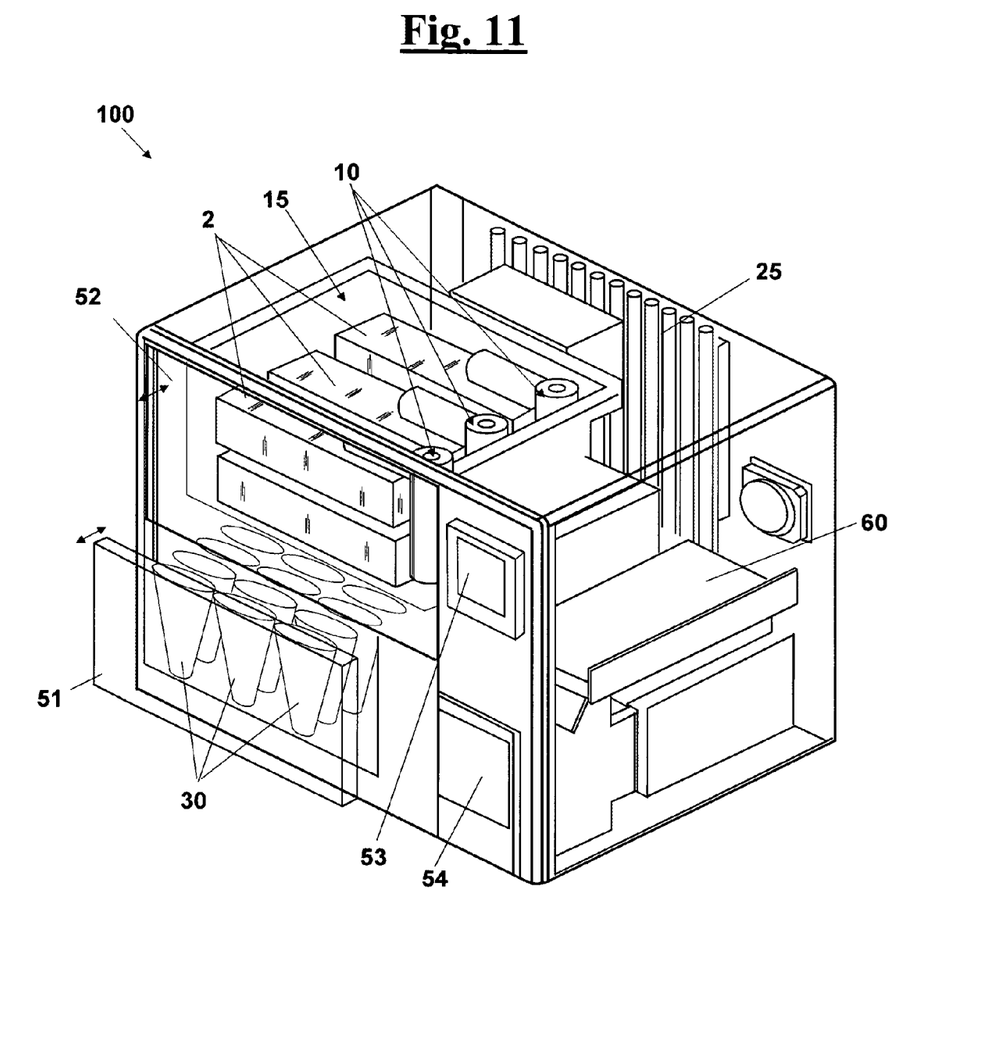
FIG. 11 shows an apparatus for dispensing a warm food product starting from a dose of ground frozen food material, which is then heated and eventually put into a stiff edible container, creating a ready to eat combination of said dose and of said edible container.

In FIG. 11, an apparatus 100 for dispensing a warm food product is shown comprising a unit 60 for receiving at least one component of the food product as a dose of ground frozen food material, heating the dose and putting it once heated, thought a portion 61, into a stiff edible container 30, creating a ready to eat combination of the dose and of the edible container. Empty edible containers 30 can be put into the machine through a door 51 and stored in the machine at a desired temperature. Also frozen blocks 30 can be stored in frozen chamber 15 at a desired temperature that is obtained by frozen device 25. A plurality of frozen blocks 2 and corresponding block grinding and feeding units 10 as above described are arranged within refrigerating chamber 15, through a door 52. A display 53 informs the user about the consumption of the blocks and on other operating parameters. The user takes an empty edible container 30 and puts an empty edible container 30 into the machine through door 54, such that it is filled with a warm food dose, obtained by heating the frozen ground dose, as previously prepared. In particular, unit 60 is a heated plate that receives the frozen ground dose that is distributed on it and that has a desired granulometry, such that they can be heated very quickly.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realize the different functions described herein could have a different nature without, for this reason, departing from the field of the invention. It is to be understood that the phraseology or terminology employed herein is for the purpose of description and not of limitation.

The invention claimed is:

1. An apparatus for dispensing a dose of ground frozen material starting from a frozen block, said apparatus comprising:
a grinding means, for grinding said frozen block in order to provide an amount of ground frozen material;
a feeding means for feeding said frozen block to said grinding means;
characterized in that said feeding means comprises:
a means for moving said frozen block for a desired predetermined grinding stroke against said grinding means, and causing the block to be ground for a length that corresponds to said grinding stroke, and then to stop said frozen block,
a means for adjusting said grinding stroke based on a calculated value of said length such that said amount of ground frozen material corresponds to a desired dose of ground frozen material.

2. An apparatus according to claim 1, wherein said means for moving comprises a push member that is adapted to push said frozen block against said grinding means.

3. An apparatus according to claim 1, wherein said means for adjusting said grinding stroke comprises a means for adjusting the speed of said grinding stroke.

4. An apparatus according to claim 1, wherein said grinding means provides at least one grater and one motor for causing said grater to rotate, a means for adjusting the speed of said motor being provided such that the granulometry of said ground frozen material can be adjusted up to achieving a desired granulometry value.

5. An apparatus according to claim 4, wherein said means for adjusting the speed of said grinding stroke is adapted to adjust the speed of said grinding stroke responsive to the speed of said motor.

6. An apparatus according to claim 4, wherein said means for adjusting the speed of said motor is adapted to adjust the speed of said motor responsive to the speed of said grinding stroke.

7. An apparatus according to claim 1, wherein a refrigerating chamber is provided in which said grinding means and said feeding means are housed and kept under a freezing temperature.

8. An apparatus according to claim 1, wherein a further means for moving a further frozen block against said grinding means is provided, such that two frozen blocks can be selectively or contemporaneously moved against said grinding means.

9. An apparatus according to claim 1, wherein said grinding means comprises a drum-shaped grater.

10. An apparatus according to claim 1, wherein said grinding means comprises one drum-shaped grater and a further means for moving a further frozen block against said drum-shaped grater is provided, wherein said means for moving and said further means for moving are arranged at an angle with respect to each other such that two frozen blocks can be moved against said drum-shaped grater, approaching said drum-shaped grater from two different directions.

11. An apparatus according to claim 1, wherein said grinding means comprises two counter-rotating drum-shaped graters.

12. An apparatus according to claim 1, wherein said grinding means comprises a single drum grater having different grating portions and is adapted to grind a block having more layers, each layer corresponding to a respective grating portion, in particular the grater portions have different cutting profiles, that are respectively adapted to grind layers of a frozen block having different density, resistance and desired final size of the ground frozen material.

13. An apparatus according to claim 1, wherein said grinding means comprises a reciprocating grating plate, in particular said grating plate having different grating portions that are adapted to grind a block having more layers, each layer corresponding to a respective grating portion.

14. An apparatus according to claim 8, wherein a plurality of independent means for moving is provided, each for moving one frozen block against said grinding means, wherein a program means is provided for operating selectively said means for moving in order to obtain a mixture of ground frozen materials according to a determined dose and a determined recipe.

15. An apparatus according to claim 1, wherein said means for moving is adapted to be charged with at least two frozen blocks in series, such that a first frozen block is moved against said grinding means and a second frozen block closely follows said first frozen block and is eventually moved against said grinding means when said first frozen block has been completely ground, wherein said means for moving comprises a push member that is adapted to push said second frozen block against said first frozen block such that said first frozen block is pushed against said grinding means and such that when said first frozen block has been completely ground a third frozen block can be charged between said push member and said second frozen block.

16. An apparatus according to claim 14, wherein said program means is adapted to operate said means for adjusting the speed of said grinding stroke in order to adjust the speed of said push member when said first frozen block has been almost completely ground up to when said grinding means starts grinding said second frozen block, in such a way that a desired dose of frozen material is ground when passing from the first block to the second block.

17. An apparatus according to claim 1, wherein said means for adjusting said grinding stroke comprises a computing control system.

\* \* \* \* \*